United States Patent [19]

Millen

[11] 4,314,920
[45] Feb. 9, 1982

[54] POLYSULFIDE RUBBERS SUITABLE FOR HOT APPLICATION

[75] Inventor: Edward G. Millen, Princeton, NJ

[73] Assignee: Thiokol Corporation, Newtown, Pa.

[21] Appl. No.: 129,541

[22] Filed: Mar. 12, 1980

Related U.S. Application Data

[62] Division of Ser. No. 913,631, Jun. 8, 1978, Pat. No. 4,263,078.

[51] Int. Cl.³ .............................................. C08L 93/00
[52] U.S. Cl. ..................................... 260/24; 525/189; 525/535; 528/374; 528/375; 528/388; 528/390
[58] Field of Search ............... 528/374, 375, 388, 390; 525/189, 535; 260/24

[56] References Cited

U.S. PATENT DOCUMENTS

| | | | |
|---|---|---|---|
| 3,225,017 | 12/1965 | Seegman et al. | 528/374 |
| 3,487,052 | 12/1969 | Millen et al. | 528/374 |
| 3,637,574 | 1/1972 | Millen et al. | 260/37 R |
| 3,923,754 | 12/1975 | Pellico | 528/374 |

FOREIGN PATENT DOCUMENTS 907793  8/1972  Canada.

*Primary Examiner*—Melvyn I. Marquis
*Attorney, Agent, or Firm*—R. E. Bright; G. K. White; R. J. Sheridan

[57] ABSTRACT

The use of polysulfide rubbers cured with zinc oxide and tetramethylthiuram disulfide and other sulfur containing cure accelerators for polyisoprene rubbers in hot applied processes and articles formed thereby are disclosed. The compositions are useful as hot applied sealants and in the extrusion of hoses and similar rubber articles.

22 Claims, No Drawings

POLYSULFIDE RUBBERS SUITABLE FOR HOT APPLICATION

This is a divisional of application Ser. No. 913,631 filed June 8, 1978, now U.S. Pat. No. 4,263,078.

BACKGROUND OF THE INVENTION

This invention relates to the art of polysulfide polymers, more particularly to thiol terminated liquid polysulfide polymers and hot melt applications, such as, hot melt applied sealants, extrusion of hoses and the like.

The use of liquid thiol terminated polysulfide polymer in caulks, sealants and the like for numerous applications is well known. Such materials have normally, until now, been chemically cured in situ.

When rapid cure was desired, a two part system was necessary requiring mixing with proper equipment just before use. One part chemical cure, on the other hand, was satisfactory in avoiding the need for in situ mixing but inherently was a slower cure requiring that provision be made for time to reach structural integrity, in some uses requiring provision of storage facilities, support racks and the like. In production applications, the extra space and/or equipment required by either cure mechanism added a cost factor whose elimination would be considered desirable by those skilled in the art.

Hot melt applied materials offer the potential to eliminate both the two part chemical cure requirement of in situ mixing and the lengthy holding requirement of one part chemical cure.

Although polysulfide rubbers are classified along with most other natural and synthetic rubbers as thermoplastic materials, they have always been considered by the art as sharing the property of most rubbers that, once vulcanized, heating to the point at which plastic flow is possible, would cause irreversible degradation of the polymeric chain and that, upon cooling, the resulting properties would be far poorer. Illustrative of the thermal degradation process is an article by Bertozzi in Rubber Chemistry and Technology, Vol. 41 (1968) p. 114 at pages 128 through 130.

The ability to formulate a cured polysulfide rubber in such fashion that the good mechanical properties characteristic of polysulfide rubbers in general is retained after extrusion under heat and pressure is thus unexpected.

Cure of thiol terminated liquid polysulfide polymers with zinc compounds including zinc oxide and tetraalkylthiuram polysulfides is disclosed by Canadian Pat. No. 907,793, Aug. 15, 1972. The further inclusion of sulfur in this cure system is disclosed in U.S. Pat. No. 3,637,574, Jan. 25, 1972.

Neither patent suggests that the cured compositions disclosed therein will have hot plastic flow properties different from other known cured polysulfide rubbers.

SUMMARY OF THE INVENTION

The invention provides a process for the preparation of a formed article of manufacture comprising a cured rubber based on a thiol terminated liquid polysulfide polymer cured with zinc oxide and a sulfur containing compound selected from 2-mercaptobenzothiazol, zinc diloweralkyldithiocarbamate, and alkyl thiuram polysulfides of the formula I:

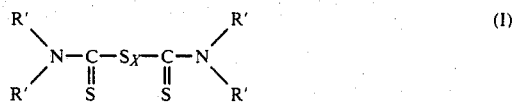

wherein x is from about 2 to about 6 and R' is alkyl of from 1 to about 10 carbon atoms either straight chain, branched chain or cyclic or R' moieties attached to the same nitrogen atom may be concatenated and taken together with said nitrogen atom to form a heterocyclic ring, which comprises:

(a) extruding said cured rubber through a die under heat and pressure; and (b) allowing the extruded rubber of step (a) to cool and solidify.

The invention also provides a process for the preparation of an article of manufacture comprising a substrate having a cured rubber based on a thiol terminated liquid polysulfide polymer cured with zinc oxide and a sulfur containing compound selected from 2-mercaptobenzothiazol, zinc diloweralkyldithiocarbamate, and alkyl thiuram polysulfides of the formula I on at least one surface thereof, which comprises:

(a) extruding said cured rubber through a die under heat and pressure onto at least one surface of a substrate; and (b) allowing said extruded rubber of step (a) to cool and solidify.

The invention also provides a cured rubber based on a thiol terminated liquid polysulfide polymer, said cured rubber being in condition to undergo plastic flow under pressure with substantial recovery of its preflow physical properties on cooling, comprising a thiol terminated liquid polysulfide polymer cured with zinc oxide and a sulfur containing compound selected from 2-mercaptobenzothiazol, zinc diloweralkyldithiocarbamate, and alkyl thiuram polysulfides of the formula I said cured polymer being maintained at a temperature of from about 220° F. to about 390° F.

The invention also provides a curable composition comprising a thiol terminated liquid polysulfide polymer, zinc oxide and a sulfur containing compound selected from 2-mercaptobenzothiazol, zinc diloweralkyldithiocarbamate, and alkyl thiuram polysulfides of the formula I and one or more extrudability improvers selected from copolymers of styrene with alkylenes, organic or inorganic reinforcing fibrous materials, phenolic resins, coumarone-indene resins, antioxidants and heat stabilizers for rubbers, polyalkylene polymers, factice, terpene resins, terpene resin esters, benzothiazyl disulfide, or diphenyl guanidine.

The extrudate produced by the processes of the invention possesses the inherent applied use characteristic while in the flowable state of being able to wet concrete, glass, aluminum, ceramic, wood and other common architectural materials, forming good bonds to such surfaces when cool, thus evidencing usefulness as a hot applied sealant for insulating glass window sandwiches, for windows in vehicles for rail and highway travel, in the prefabrication of building components and the like.

DESCRIPTION OF THE PREFERRED EMBODIMENT

The manner of making and using the compositions and processes of the invention will now be described with reference to a specific embodiment thereof; namely, a cured rubber (III) based on a thiol terminated liquid polysulfide polymer of the general formula:

$$HS-(CH_2CH_2OCH_2OCH_2CH_2SS)_nCH_2CH_2OCH_2OCH_2CH_2-SH \quad (II)$$

wherein n is sufficient to give an average molecular weight of about 7500 and containing about 0.5% random crosslinking introduced by incorporation of trichloropropane in the original polysulfide polymer condensation and cured with zinc oxide and tetramethylthiuram disulfide.

To prepare III, II may be blended in convention mixing equipment, conveniently in such fashion as to avoid entrainment of air in the blend, with a curing amount of zinc oxide, conveniently about 2 parts by weight (pbw) to about 25 pbw per hundred pbw liquid polysulfide polymer, preferably from about 3 pbw to about 10 pbw, and an effective amount of tetramethylthiuram disulfide, conveniently from about 0.1 pbw to about 50 pbw per hundred pbw of liquid polysulfide polymer, preferably from about 0.5 pbw to about 10 pbw. The blended polymer and curing agents may then be formed into any desired shape by conventional techniques; such as, casting in a mold or extrusion as a tape and cured either at room temperature or obviously more quickly at elevated temperatures, such as, about 70° C.

One skilled in the art will recognize that in addition to the thiol terminated liquid polysulfide polymer II illustrated herein above, other polysulfide polymers of the general formula:

$$HS-(R-SS)_n-R-SH$$

wherein n is 4 up to a value sufficient to give a molecular weight of about 10,000, which may be uncrosslinked or contain up to about 2% crosslinking and wherein R is a hydrocarbon, oxahydrocarbon or thiahydrocarbon diradical such as the ethylene radical

—CH₂CH₂— the butylene radical

—CH₂CH₂CH₂CH₂— the diethylether diradical

—CH₂CH₂OCH₂CH₂— the diethylformal diradical

—CH₂CH₂OCH₂OCH₂CH₂— and the like will be suitable for the preparation of compounds suitable for use in the processes of the invention.

U.S. Pat. No. 2,466,963 teaches the synthesis of this type of polymer. A number of these polymers are commercially available from Thiokol Corporation.

In the processes for the use of the compositions of the invention, their application by the use of conventional equipment is contemplated. For example, a cured ribbon of I may be extruded under heat and pressure from a heated screw-type extruder gun. Their use in replacing currently used chemically cured polymers, as well as current hot applied materials and mechanical supports or secondarily applied chemically cured supporting compositions, are contemplated. For example, I may be extruded as above directly into edges of a channel between two pieces of window glass. Upon cooling, the unit so formed will be mechanically strong enough for further processing.

The temperatures employed for hot melt application will be those commonly employed in conventional hot melt processing; desirably they will be sufficient to cause relatively easy plastic flow from the extrusion equipment without being excessively high so as to cause obvious decomposition or reversion to a permanent liquid in a small test sample. Conveniently, these temperatures will range from about 220° F. to about 390° F., preferably about 250° to about 375° F., most preferably about 250° to 350° F.

In preparing the compositions of the invention, the incorporation of standard additives similar to those already employed in analogous compositions in the relevant art area is contemplated. These will include fillers such as calcium carbonate, barium sulfate, neutral clays and the like, pigments and opaquing agents such as titanium dioxide and carbon black, thixotropic flow control agents as, for example, the proprietary caster oil derivative THIXCIN GR and adhesion promotors such as the silane adhesion promoter A-187.

It has additionally been found that the inclusion of certain other additives in hot melt formulations of thiol terminated polysulfide polymers cured with zinc oxide and compounds of formula I or in hydroxy terminated polysulfide rubbers results in improvement in the extrudability of the formulated materials and in the post extrusion properties.

Typical of these materials are copolymers of styrene with alkylenes such as isoprene, ethylene, and butylene; various reinforcing fibrous materials, both organic and inorganic, such as polethylene fibers, phenolic resins, coumarone-indene resins, organic and inorganic antioxidants and known heat stabilizers for rubbers; polyalkylene polymers such as polyisobutylenes; factice; terpene resins and terpene resin esters. Benzothiazyl disulfide and diphenyl guanidine are also additives useful as extrudability improvers. The use of such optional additives is contemplated by the formulations of the invention both in the specification and in the appended claims.

While the use of sulfur containing compounds in combination with zinc oxide for the preparation of cured polysulfide rubber suitable for use in the processes of the invention has been illustrated using tetramethylthiuram disulfide, it will be obvious to one skilled in the art that other sulfur containing compounds which are known sulfur containing vulcanization accelerators for polyisoprene rubbers such as 2-mercaptobenzothiazol, zinc diloweralkyldithiocarbamates, and other alkyl thiuram polysulfides of formula I may be substituted for tetramethylthiuram disulfide in similar proportions using identical processing and cure techniques to prepare cured polysulfide rubbers possessing similar extrusion and recovery properties. Illustrative of zinc diloweralkyldithiocarbamates are those compounds of the general formula:

$$(R'')_2NC(=S)-S-Zn-S-C(=S)N(R'')_2$$

wherein R" is a straight chain, branched chain, or cyclic hydrocarbon radical of from 1 to about 8 carbon atoms, such as methyl, ethyl, hexyl and the like. These compounds are commercially available or are readily synthesized by well known procedures.

In addition to tetramethylthiuram disulfide, compounds illustrative of formula I are tetraethylthiuram disulfide, tetraamylthiuram disulfide, tetradecylthiuram disulfide, tetraoctylthiuram disulfide, tetracyclohexylthiuram disulfide, dipentamethylenethiuram tetrasulfide, dipentamethylenethiuram hexasulfide and the like. These compounds are also either commercially available or may be synthesized by well known procedures.

The following examples further illustrate the best mode contemplated by the inventor for the practice of his invention.

EXAMPLE 1

Sealant formulations suitable for insulated glass use are formulated from the ingredients shown below in the table with the respective quantities given in parts by weight (pbw). Processing is performed in conventional sealant mixing equipment and the mixtures are allowed to cure in the form of tapes at room temperature. Physical properties and "gunning" properties are determined on the cured material with the results also shown below in the table.

| Ingredient | Formulation No. (Quantity pbw) | | | |
|---|---|---|---|---|
| | 1 | 2 | 3 | 4 |
| Polysulfide polymer II | 100 | 100 | 100 | 100 |
| Calcium carbonate | 80 | 80 | 80 | 80 |
| CHLOROWAX 70 (chlorinated paraffin - Diamond Shamrock Co.) | 25 | 25 | 25 | 25 |
| THIXCIN GR (castor oil derivative -National Lead) | 8 | 8 | 8 | 8 |
| A-187 (silane adhesive additive - Union Carbide) | | | | |
| Zinc Oxide | 5 | 5 | 2.5 | — |
| 1:1 pbw Levulinic Acid/SANTICIZER 261 (proprietary plasticizer - Monsanto Co.) | 2 | 2 | 2 | — |
| Tetramethylthiuram disulfide | — | 1 | 1 | 1 |
| Processability (Baker Perkins Mixer - Room Temp.) | all very good | | | |
| Shore A Hardness after Room Temp. Cure | no cure | 40 | 30 | 25 |
| Gunnability at 375° F. | not gunnable | Excellent | Excellent | Excellent |
| Wetting of glass and aluminum at 375° F. | — | Excellent | Excellent | Excellent |
| Shore A Hardness after cooling | still liquid after 1 week | 38 | 35 | 25 |

EXAMPLE 2

Additional formulations suitable for use as window sealants are prepared, cured and tested in a fashion analogous to that of Example 1. The formulations in pbw and results obtained are shown in the table below.

| Ingredient | Formulation No. (Quantity pbw) | | | | | | | |
|---|---|---|---|---|---|---|---|---|
| | 1 | 2 | 3 | 4 | 5 | 6 | 7 | 8 |
| Polysulfide Polymer II | 100 | 100 | 100 | 100 | 100 | 100 | 100 | 100 |
| KRATON G1107 (Styrene-Isoprene-Styrene Block Copolymer - Shell Chemical Co.) | 13 | — | — | 6 | 7 | — | — | — |
| BaSO$_4$(Barytes) | 80 | 80 | 80 | 80 | 80 | 80 | 80 | 80 |
| CHLOROWAX 70 | 25 | 25 | 25 | 25 | 25 | 25 | 25 | 25 |
| Carbon Black | — | — | — | — | 0.5 | 0.4 | 0.4 | 0.4 |
| Zinc Oxide | 5 | 5 | 5 | 5 | 5 | 5 | 5 | 5 |
| A-187 | 2 | 2 | 2 | 2 | 2 | 2 | 2 | 2 |
| 1:1 pbw Levulinic Acid/SANTICIZER 278* | 2 | — | — | 1 | — | — | — | — |
| Fluffy polyethylene fiber | 1 | 3 | 1.5 | — | — | — | — | — |
| Tetramethylthiuram disulfide | 1 | 1 | 1 | 1 | 1 | 1 | 1 | 1 |
| Factice | — | — | — | — | — | — | 10 | — |
| Coumarone Indene Resin (CUMAR R-16 - Allied Chemical Corp.) | — | — | — | — | — | — | — | 5 |

| Property | Formulation No. | | | | | | | |
|---|---|---|---|---|---|---|---|---|
| | 1 | 2 | 3 | 4 | 5 | 6 | 7 | 8 |
| Processability (Baker Perkins Room Temp.) | all samples O.K. | | | | | | | |
| Gunnability[1] (300° F.) | 6 | 6 | 1[2] | 5 | 4 | 2 | 3 | 3 |
| Gunnability (325° F.) | — | — | — | — | — | 2 | 2 | — |
| Gunnability (375° F.) | 6 | 2[2] | 1[3] | — | 2[3] | 5[3] | — | — |
| Wettability[1] (300° F.) | 6 | 6 | 1 | 5 | 4 | 2 | 3 | 3 |
| Hardness (Shore A) After Cure | 38 | 24 | 27 | 22 | 35 | 30 | 31 | 29 |
| Hardness (Shore A) 3 days after 300° F. Gun | 20 | (3) | (3) | 35 | 30 | 31 | 37 | 28 |

Formulations 2, 4 and 6 are repeated. After treatment in Baker Perkins mixer only and cure, the following results are found.

| Property | Formulation No | | |
|---|---|---|---|
| | 2 | 4 | 6 |
| Gunnability at 300° F. | 2 | 3 | 2 |
| Wettability at 300° F. | 2 | 3 | 2 |
| Shore A 1 day | 35 | 25 | 30 |
| Shore A 1 week | 35 | 27 | 31 |

The formulations are then put through a hot rubber mill with the following results:

-continued

| Property | Formulation No. | | |
|---|---|---|---|
| | 2 | 4 | 6 |
| Gunnability 300° F. | 4 | 4 | 2 |
| Wettability 300° F. | 4 | 4 | 2 |
| Shore A (1 day) | 20[4] | 22 | 25 |
| Shore A (1 week) | 20[4] | 22 | 22 |

Notes:
*(proprietary plasticizer - Monsanto Co.)
[1] Index for Gunnability and Wettability: 1 = superior; 2 = excellent; 3 = very good; 4 = good; 5 = fair; 6 = poor; 7 = very poor
[2] partial reversion to liquid state
[3] complete reversion to liquid state.
[4] = Tacky feel

EXAMPLE 3

Thermoplastic rubber based sealant formulations are prepared analogously to Example 1 from the ingredients shown and the properties of the cured formulations determined.

EXAMPLE 4

Thermoplastic rubber based sealant formulations are prepared analogously to Example 1 from the ingredients in the quantities shown in the table below. Properties of the cured preparations are determined and listed.

| Ingredient | Formulation No. (Quantity pbw) | | | | | |
|---|---|---|---|---|---|---|
| | 1 | 2 | 3 | 4 | 5 | 6 |
| Polysulfide Polymer II | 100 | 100 | 100 | 100 | 100 | 100 |
| KRATON G 1107 | 6 | — | — | 6 | — | — |
| KRATON G 1650 (styrene ethylene butylene) (block copolymers - Sell) | — | 6 | — | — | 6 | — |
| KRATON G 4600 (Chem. Co.) | — | — | 6 | — | — | 6 |
| CHLOROWAX 70 | 25 | 25 | 25 | 25 | 25 | 25 |
| $BaSO_4$(Barytes) | 80 | 80 | 80 | 80 | 80 | 80 |
| Zinc Oxide | 4 | 4 | 4 | 6 | 6 | 6 |
| Levulinic Acid/SANTICIZER 278 (1:1) | 2 | 2 | 2 | — | — | — |
| Tetramethylthiuram disulfide | 1 | 1 | 1 | 1 | 1 | 1 |
| Properties | | | | | | |
| Processability at 200° F. | Fair for all samples | | | | | |
| Work Life | All samples set up in mixer | | | | | |
| Hardness (Shore A) Before Gun. | 45 | 45 | 45 | 25 | 35 | 25 |
| Gunnability at 375° F. | Fair for all samples | | | | | |
| Wettability at 375° F. | Fair for all samples | | | | | |
| Hardness (Shore A) after cool | 30 | 25 | 35 | 30 | 30 | 30 |

| Ingredient | Formulation No. (Quantity (pbw) | | | | | | | | | |
|---|---|---|---|---|---|---|---|---|---|---|
| | 1 | 2 | 3 | 4 | 5 | 6 | 7 | 8 | 9 | 10 |
| Polysulfide Polymer II | 100 | 100 | 100 | 100 | 100 | 100 | 100 | 100 | 100 | 100 |
| KRATON G 1107 | 7 | 5 | 3 | 1 | 7 | 5 | 3 | 1 | 3 | 3 |
| CHLOROWAX 70 | 25 | 25 | 25 | 25 | 25 | 25 | 25 | 25 | 25 | 25 |
| $BaSO_4$(Barytes) | 80 | 80 | 80 | 80 | 80 | 80 | 80 | 80 | 80 | 80 |
| Zinc Oxide | 5 | 5 | 5 | 5 | 5 | 5 | 5 | 5 | 5 | 5 |
| A-187 | 2 | 2 | 2 | 2 | 2 | 2 | 2 | 2 | 2 | 2 |
| Levulinic Acid/SANTICIZER 178(1:1) | 2 | 2 | 2 | 2 | — | — | — | — | 2 | — |
| Tetramethylthiuram disulfide | 1 | 1 | 1 | 1 | 1 | 1 | 1 | 1 | — | 2 |
| Properties | | | | | | | | | | |
| Processability | Fair for all samples | | | | | | | | | |
| Work Life (Min.) | (1) | (1) | (1) | (1) | 5 | 5 | 5 | 5 | (2) | 5 |
| Cure Time (Room Temp.Min.) | (1) | (1) | (1) | (1) | 10 | 10 | 10 | 10 | (2) | 10 |
| Tackfree Time (Room Temp.Min.) | (1) | (1) | (1) | (1) | 15 | 15 | 20 | 20 | (2) | 20 |
| Hardness (Shore A) Before Gun | 25 | 25 | 40 | 20 | 20 | 25 | 25 | 20 | — | 15 |
| Gunnability at 375° F. | exc. | good | poor | exc. | exc. | fair-good | fair-good | fair-good | — | good |
| Wettability at 375° F. | exc. | good | poor | exc. | exc. | fair-good | fair-good | fair-good | — | good |
| Hardness (Shore A) After Gun. | 24 | 22 | 37 | 24 | 25 | 20 | 20 | 20 | — | 15 |
| Adhesion to glass (type of failure)[3] | coh | coh | adh-coh | coh | adh | adh | coh | adh | — | adh |
| Adhesion to alum. (type of failure) | coh | coh-adh | adh-coh | coh | adh | adh | coh | coh | — | adh |

Notes:
(1) set up mixer
(2) no cure
(3) coh = cohesive failure (failure in sealant bead); adh = adhesive failure (failure at joint between sealant and substrate); where both types are indicated, predominant mode of failure listed first. Even adhesive failures in these tests showed a strong bond to substrate before failure.

EXAMPLE 5

|  | Formulation (Quantity pbw) | | | | | |
|---|---|---|---|---|---|---|
| Ingredient | 1 | 2 | 3 | 4 | 5 | 6 |
| Polysulfide Polymer II | 100 | 100 | 100 | 100 | 100 | 100 |
| Fluffy Polyethylene fibers | 3 | 1.5 | — | 3 | 1.5 | — |
| CHLOROWAX 70 | 25 | 25 | 25 | 25 | 25 | 25 |
| BaSO$_4$ (Barytes) | 80 | 80 | 80 | 80 | 80 | 80 |
| Zinc Oxide | 5 | 5 | 5 | 5 | 5 | 5 |
| Levulinic Acid/SANTICIZER 278 (1:1) | 2 | 2 | 2 | — | — | — |
| A-187 | 2 | 2 | 2 | 2 | 2 | 2 |
| Tetramethylthiuram disulfide | 1 | 1 | 1 | 1 | 1 | 1 |
| Properties | | | | | | |
| Processing at 200° F. | All samples processed satisfactorily | | | | | |
| Work Life at 200° F. | All samples set up in mixer | | | | | |
| Hardness (Shore A) before gun. | 45 | 35 | 25 | 45 | 40 | 30 |
| Gunnability at 375° F. | good | excellent | | | | |
| Wettability at 375° F. | good | excellent | | | | |
| Hardness (Shore A) after gun. | 25 | 30 | 25 | 35 | 35 | 15 |
| Adhesion to aluminum | no adh. | strong adh. | strong adh. | strong adh. | strong adh. | strong adh. |
| Adhesion to glass | adh.-coh | strong adh. | coh. | strong adh. | strong adh. | coh. |

Thermoplastic rubber based sealant formulations are prepared analogously to Example 1 from the ingredients shown in the quantities tabulated below. The properties of the formulations are also indicated.

|  | Formulation (Quantity pbw) | | | | | |
|---|---|---|---|---|---|---|
|  | 1 | 2 | 3 | 4 | 5 | 6 |
| Ingredient | | | | | | |
| Polysulfide Polymer II | 100 | 100 | 100 | 100 | 100 | 100 |
| KRATON G 1007 | — | 2 | 5 | 7.5 | 10 | 20 |
| BaSO$_4$ (Barytes) | 80 | 80 | 80 | 80 | 80 | 80 |
| CHLOROWAX 70 | 25 | 25 | 25 | 25 | 25 | 25 |
| Carbon black (Sterling S) | 0.4 | 0.4 | 0.4 | 0.4 | 0.4 | 0.4 |
| Zinc Oxide | 5 | 5 | 5 | 5 | 5 | 5 |
| Tetramethylthiuram disulfide | 1 | 1 | 1 | 1 | 1 | 1 |
| Properties | | | | | | |
| Processability (Baker Perkins Mixer) @ 280° F. | good | (poor dispersion) | | | | |
| Hardness Shore A (1 day) | 22 | 22 | 23 | 23 | 22 | 23 |
| Processability (Hot-2 roll mill) | | (fair) | | | | |
| Hardness Shore A (1 day) | — | 25 | 25 | 25 | 25 | 27 |
| Gunnability (300° F.) | exc. | fair | poor | poor | poor | poor |
| Wettability (300° F.) | exc. | fair | poor | poor | poor | poor |
| Gunnability (350° F.) | exc. | exc. | exc. | exc. | exc. | exc. |
| Wettability (350° F.) | exc. | exc. | exc. | exc. | exc. | exc. |
| Adhesion to glass | adh/con | adh. | adh. film | adh. film | adh. film | adh. film |
| Hardness after gunning (Shore A) | 31 | 31 | 31 | 31 | 31 | 31 |
| Stress/strain properties (pressed out 10 min/287° F.) | | | | | | |
| Tensile (psi) | 110 | 130 | 110 | 120 | 150 | 175 |
| Elongation (%) | 300 | 370 | 340 | 400 | 510 | 780 |
| Modulus 100% | 74 | 75 | 69 | 69 | 76 | 78 |
| 300% | 110 | 110 | 109 | 105 | 118 | 120 |
| Hardness (Shore A) | 35 | 40 | 36 | 37 | 40 | 38 |

EXAMPLE 6

Thermoplastic rubber based sealant compositions are formulated analogously to Example 1 from the ingredients shown in the quantities tabulated below. The physical properties of the formulation are tabulated also.

EXAMPLE 7

Thermoplastic rubber based sealants are formulated analogously to Example 1 from the ingredients shown in the quantities tabulated below. Physical properties of the formulations are also tabulated.

|  | Formulation (Quantity pbw) | | | | | | | | | | | | | | |
|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 |
| Ingredient | | | | | | | | | | | | | | | |
| Polysulfide Polymer II | 100 | 100 | 100 | 100 | 100 | 100 | 100 | 100 | 100 | 100 | 100 | 100 | 100 | 100 | 100 |
| KRATON G 1107 | — | 6 | 2 | — | 6 | 2 | — | 6 | 2 | — | 6 | 2 | — | 6 | 2 |
| CK-2400* | — | — | — | 2 | 2 | 2 | 8 | 8 | 8 | — | — | — | — | — | — |
| CK-2432* | — | — | — | — | — | — | — | — | — | 2 | 2 | 2 | 8 | 8 | 8 |
| CaCO$_3$ | 80 | — | — | 80 | — | — | 80 | — | — | 80 | — | — | 80 | — | — |
| Barytes | — | 80 | 80 | — | 80 | 80 | — | 80 | 80 | — | 80 | 80 | — | 80 | 80 |
| A-187 | 2 | 2 | 2 | 2 | 2 | 2 | 2 | 2 | 2 | 2 | 2 | 2 | 2 | 2 | 2 |

-continued

| | Formulation (Quantity pbw) | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Zinc Oxide | 5 | 5 | 5 | 5 | 5 | 5 | 5 | 5 | 5 | 5 | 5 | 5 | 5 | 5 | 5 |
| Levulinic Acid/ SANTICIZER 278 (1:1) | 1 | 1 | 1 | 1 | 1 | 1 | 1 | 1 | 1 | 1 | 1 | 1 | 1 | 1 | 1 |
| Tetramethylthiuram disulfide | 1 | 1 | 1 | 1 | 1 | 1 | 1 | 1 | 1 | 1 | 1 | 1 | 1 | 1 | 1 |
| Properties | | | | | | | | | | | | | | | |
| Processability at 200° F. | all processed satisfactorily; all set up in mixer | | | | | | | | | | | | | | |
| Gunnability at 375° F. | (3) | (3) | (3) | (3) | (3) | (3) | (1) | (1) | (1) | (1) | (1) | (1) | (1) | (1) | (1) |
| Wettability at 375° F. | (3) | (3) | (3) | (3) | (3) | (3) | (3) | (3) | (3) | (3) | (3) | (3) | (3) | (3) | (2) |
| Adhesion to glass | | | | | | | | all adhesive failure | | | | | | | |
| Adhesion to aluminum | | | | | | | | all adhesive failure | | | | | | | |

Notes:
*Non Heat Reactive Phenolic Resin - Union Carbide
(1) = good;
(2) = fair;
(3) = poor

EXAMPLE 8

Thermoplastic rubber based sealant formulations are prepared analogously to Example 1 from the ingredients shown in the quantities tabulated below. Physical properties of the formulations are also tabulated.

| | Formulation (Quantity pbw) | | | | |
|---|---|---|---|---|---|
| | 1 | 2 | 3 | 4 | 5 |
| Ingredient | | | | | |
| Polysulfide Polymer II | 100 | 100 | 100 | 100 | 100 |
| Barytes | 80 | 80 | 80 | 80 | 80 |
| CHLOROWAX 70 | 25 | 25 | 25 | 25 | 25 |
| Tetrakis [methylene 3-(3',5'-di-tert-butyl-4'-hydroxyphenyl)propionate]methane (IRGANOX 1010) | — | 1 | 1 | — | — |
| Octadecyl 3-(3',5'-di-tert-butyl-4'hydroxyphenyl) propionate (IRGANOX 1076) | — | — | — | 1 | 1 |
| KRATON G1107 | — | — | 6 | — | 6 |
| A-187 | 2 | 2 | 2 | 2 | 2 |
| Zinc Oxide | 5 | 5 | 5 | 5 | 5 |
| Levulinic Acid/SANTICIZER 278 (1:1) | 1 | 1 | 1 | 1 | 1 |
| Tetramethylthiuram disulfide | 1 | 1 | 1 | 1 | 1 |
| Properties | | | | | |
| Initial Hardness (Shore A) | 35 | 25 | 35 | 25 | 25 |
| Gunnability (375° F.) | exc. | exc. | exc. | good | exc. |
| Wettability (375° F.) | exc. | exc. | exc. | fair | exc. |
| Hardness after cool (Shore A) | 30 | 20 | 30 | 25 | 15 |
| Hardness (Shore A) 375° F. | | | | | |
| 1 minute | 15 | 25 | 27 | 19 | 26 |
| 2 minutes | 12 | 0 | 25 | 19 | 0 |
| 3 minutes | 9 | 0 | 19 | 16 | 0 |
| Appearance @ 375° F. | | | | | |
| 1 minute | OK | OK | OK | OK | OK |
| 2 minutes | | (1) | soft | OK | OK | soft |
| 3 minutes | | (2) | soft | (1) | (1) | soft |
| 5 minutes | | | | reverted | | |
| Bead Adhesion | | | | | |
| Glass (after 1 wk. exp. H₂O) | coh | coh | coh | coh | coh |
| Aluminum (after 1 wk. exp. H₂O) | coh | coh | coh | coh | coh |

Note:
(1) slightly soft
(2) slightly reverted

EXAMPLE 9

Thermoplastic rubber based sealant formulations are prepared analogously to Example 1 from the ingredients shown in the quantities tabulated below. Physical properties of the formulations are also tabulated.

| | Formulation (Quantity pbw) | | | | | |
|---|---|---|---|---|---|---|
| | 1 | 2 | 3 | 4 | 5 | 6 |
| Ingredient | | | | | | |
| Polysulfide polymer II | 100 | 100 | 100 | 100 | 100 | 100 |
| Barytes | 80 | 80 | 80 | 80 | 80 | 80 |
| CHLOROWAX 70 | 25 | 25 | 25 | 25 | 25 | 25 |
| IRGANOX 1010 | 3 | 3 | — | — | — | — |
| IRGANOX 1076 | — | — | 3 | 3 | — | — |
| Magnesium oxide | — | — | — | — | 5 | 5 |
| KRATON G 1107 | — | 6 | — | 6 | — | 6 |
| A-187 | 2 | 2 | 2 | 2 | 2 | 2 |
| Zinc Oxide | 5 | 5 | 5 | 5 | 5 | 5 |
| Tetramethylthiuram disulfide | 1 | 1 | 1 | 1 | 1 | 1 |
| Physical Properties | | | | | | |
| Initial Hardness (Shore A) | 20 | 18 | 5 | 5 | 5 | 5 |
| Gunnability at 375° F. | exc. | exc. | exc. | exc. | exc. | exc. |
| Stability at 375° F. | | | | | | |
| 1 min. Hardness (Shore A) | 10 | 15 | 10 | 15 | 20 | 5 |

-continued

| | Formulation (Quantity pbw) | | | | | |
|---|---|---|---|---|---|---|
| | 1 | 2 | 3 | 4 | 5 | 6 |
| 3 min. Hardness (Shore A) | 5 | 10 | 10 | 5 | 10 | 5 |
| 5 min. Hardness (Shore A) | 0 | 0 | 0 | 0 | 0 | 0 |

EXAMPLE 11

Thermoplastic rubber based sealant formulations are prepared analogously to Example 1 from the ingredients shown in the quantities tabulated below. Physical properties of the formulations are also tabulated.

| | Formulation (Quantity pbw) | | | | | | |
|---|---|---|---|---|---|---|---|
| | 1 | 2 | 3 | 4 | 5 | 6 | 7 |
| Ingredient | | | | | | | |
| Polysulfide polymer II | 100 | 100 | 100 | 100 | 100 | 100 | 100 |
| Barytes | 80 | 80 | 80 | 80 | 80 | 80 | 80 |
| CHLOROWAX 70 | 25 | 25 | 25 | 25 | 25 | 25 | 25 |
| KRATON G 1107 | — | 2 | — | — | 7 | — | — |
| Thermoplastic phenolic resin CK 2432 - Union Carbide | 2 | 2 | — | — | — | — | — |
| Factice | — | — | 10 | 20 | 15 | — | — |
| Cumarone-Indene resin - CUMAR R16 Neville Chem. Co. | — | — | — | — | — | 5 | 10 |
| A-187 | 2 | 2 | 2 | 2 | 2 | 2 | 2 |
| Zinc oxide | 5 | 5 | 5 | 5 | 5 | 5 | 5 |
| Tetramethylthiuram disulfide | 1 | 1 | 1 | 1 | 1 | 1 | 1 |
| Properties | | | | | | | |
| Gunnability at 375° F. | good | good | fair | exc. | exc. | — | — |
| Gunnability at 300° F. | — | — | — | exc. | exc. | exc. | exc. |
| Wettability at 375° F. | good | good | fair | exc. | exc. | — | — |
| Wettability at 300° F. | — | — | — | exc. | exc. | exc. | exc. |
| Hardness (Shore A) before gun (1) | 25 | 25 | 30 | 15 | 15 | 30 | 30 |
| Hardness (Shore A) after gun (1) | 25 | 15 | 30 | 30 | 20 | 19 | 20 |

Note:
(1) All hardness readings are instantaneous as values drift.

EXAMPLE 10

Thermoplastic rubber based sealant formulations are prepared analogously to Example 1 from the ingredients shown in the quantities tabulated below. Physical properties of the formulation are also tabulated.

EXAMPLE 12

Thermoplastic rubber based sealant formulations are prepared analogously to Example 1 from the ingredients shown in the quantities tabulated below. Physical properties of the formulation are also tabulated.

| | Formulation (Quantity pbw) | | | | | | |
|---|---|---|---|---|---|---|---|
| | 1 | 2 | 3 | 4 | 5 | 6 | 7 |
| Ingredient | | | | | | | |
| Polysulfide polymer II | 100 | 100 | 100 | 100 | 100 | 100 | 100 |
| KRATON G 1107 | — | — | — | 2 | 2 | — | 7 |
| Barytes | 80 | 80 | 80 | 80 | 80 | 80 | 80 |
| CHLOROWAX 70 | 25 | 25 | 25 | 25 | 25 | 25 | 25 |
| Vistanox LM-MS (polyisobutylene-Exxon) | — | 10 | 25 | 10 | 25 | — | — |
| Vistanox L-140 (polyisobutylene-Exxon) | — | — | — | — | — | 5 | 5 |
| A-187 | 2 | 2 | 2 | 2 | 2 | 2 | 2 |
| Zinc Oxide | 5 | 5 | 5 | 5 | 5 | 5 | 5 |
| Tetramethylthiuram disulfide | 1 | 1 | 1 | 1 | 1 | 1 | 1 |
| Properties | | | | | | | |
| Processability at 200° F. (Baker Perkins mixer) | exc. | | | | fair | | |
| Hardness (Shore A) after process. | 25 | 15 | 25 | 25 | 15 | — | — |
| Gunnability at 375° F. | exc. | exc. | good | good | good | — | — |
| Gunnability at 300° F. | exc. | — | — | — | — | exc. | good |
| Wettability at 375° F. | exc. | exc. | good | good | good | exc. | good |
| Wettability at 300° F. | exc. | — | — | — | — | exc. | good |

| | Formulation (Quantity pbw) | | | | | | | |
|---|---|---|---|---|---|---|---|---|
| | 1 | 2 | 3 | 4 | 5 | 6 | 7 | 8 |
| Ingredient | | | | | | | | |
| Polysulfide polymer II | 100 | 100 | 100 | 100 | 100 | 100 | 100 | 100 |
| Barytes | 80 | 80 | 80 | 80 | 80 | 80 | 80 | 80 |
| CHLOROWAX 70 | 25 | 25 | 25 | 25 | 25 | 25 | 25 | 25 |
| Carbon black | 0.4 | 0.4 | 0.4 | 0.4 | 0.4 | 0.4 | 0.4 | 0.4 |
| Polyterpene resin (ZONAREZ 7115 Arizona Chem. Co.) | 5 | 10 | — | — | — | — | — | — |
| Polyterpene resin (ZONAREZ B-40 Arizona Chem. Co.) | — | — | 5 | 10 | — | — | — | — |

|  | Formulation (Quantity pbw) | | | | | | | |
|---|---|---|---|---|---|---|---|---|
|  | 1 | 2 | 3 | 4 | 5 | 6 | 7 | 8 |
| Resin ester (Zonester 55, Arizona Chem. Co. | — | — | — | — | 5 | 10 | — | — |
| Resin ester (Zonester 85, Arizona Chem. Co. | — | — | — | — | — | — | 5 | 10 |
| A-187 | 2 | 2 | 2 | 2 | 2 | 2 | 2 | 2 |
| Zinc Oxide | 5 | 5 | 5 | 5 | 5 | 5 | 5 | 5 |
| Tetramethylthiuram disulfide | 1 | 1 | 1 | 1 | 1 | 1 | 1 | 1 |
| Physical Properties | | | | | | | | |
| Hardness before gun. (Shore A)[1] | 35 | 35 | 20 | 30 | 30 | 30 | 30 | 30 |
| Gunnability at 300° F. | exc. | exc. | exc. | exc. | exc. | exc. | exc. | exc. |
| Wettability at 300° F. | exc. | exc. | exc. | exc. | exc. | exc. | exc. | exc. |
| Hardness (Shore A) 1 day after gun[1] | 15 | 10 | 10 | 10 | 20 | 20 | 15 | 15 |
| Hardness (Shore A) 14 days after gun[1] | 28 | 23 | 25 | 27 | 28 | 27 | 24 | 24 |

[1]Instantaneous readings - all samples tend to drift while measure.

EXAMPLE 13

Sealant formulations based on thermoplastic rubber are formulated from the ingredients tabulated, in the quantities shown in parts by weight as in the previous examples. Properties determined on the cured formulation are also tabulated.

| Ingredient | Quantity (pbw) |
|---|---|
| Polysulfide polymer II | 100 |
| CHLOROWAX 70 | 25.0 |
| BaSO$_4$ (Barytes) | 80.0 |
| A-187 | 2.0 |
| Carbon Black | 0.4 |
| Benzothiazyl disulfide | 0.3 |
| Diphenyl quanidine | 0.1 |
| Zinc oxide | 5.0 |
| Tetramethylthiuram disulfide | 1.3 |

Properties

Mixing—excellent
Work life—1 hour
Cure time (Room Temp)—5 hours
Tack free time (Room Temp)—5 hours
Hardness before extrusion (Shore A)—10
Hardness after 7 days (Shore A)—25
Gunnability at 250° F.

Standard extrusion conditions (Hardemann "P" Shooter)—excellent
Hardness after extrusion (Shore A)
 1 hour—15
 1 day—25
 7 days—25
Determination of effect of dwell time in gun on hardness of thoroughly cooled extrudate and of ease of extrusion
 After hold temp. 1 min. excellent extrudability
 Hardness on cooling (Shore A)—20

After hold temp. 3 min. excellent extrudability
 Hardness on cooling (Shore A)—20

After hold temp. 5 min. excellent extrudability
 Hardness on cooling (Shore A)—15

After hold temp. 10 min. excellent extrudability
 Hardness on cooling (Shore A)—13

Adhesion 1 day after extrusion (room temperature)
 Glass—cohesive
 Aluminum—cohesive
7 days after extrusion (room temperature-water submergence)
 Glass—cohesive
 Aluminum—cohesive

EXAMPLE 14

Sealant formulations based on thermoplastic rubber are formulated from the ingredients tabulated, in the quantities shown in parts by weight as in the previous examples. Properties determined on the cured formulations are also tabulated.

|  | Formulation (Quantity pbw) | | | | | | | |
|---|---|---|---|---|---|---|---|---|
|  | 1 | 2 | 3 | 4 | 5 | 6 | 7 | 8 |
| Ingredient | | | | | | | | |
| Polysulfide polymer II | 100 | 100 | 100 | 100 | 100 | 100 | 100 | 100 |
| BaSO$_4$ | 80 | 80 | 80 | 80 | 80 | 80 | 80 | 80 |
| CHLOROWAX 70 | 25 | 25 | 25 | 25 | 25 | 25 | 25 | 25 |
| A-187 | 2 | 2 | 2 | 2 | 2 | 2 | 2 | 2 |
| Zinc Oxide | 5 | 5 | 5 | 5 | 5 | 5 | 5 | 5 |
| Carbon black | 0.4 | 0.4 | 0.4 | 0.4 | 0.4 | 0.4 | 0.4 | 0.4 |
| Dipentamethylenethiuram hexasulfide | 1 | 2.5 | — | — | — | — | — | 1 |
| Zinc dimethyldithiocarbamate | — | — | 2.5 | — | — | — | — | — |
| Tetraethylthiuram disulfide | — | — | — | 1 | 2.5 | — | — | — |
| Tetramethylthiuram disulfide | — | — | — | — | — | 1 | 0.75 | — |
| 2-mercaptobenzothiazole | — | — | — | — | — | 0.75 | 1 | — |
| p-quinone dioxime | — | — | — | — | — | — | — | 0.5 |
| Diphenyl guanidine | — | — | — | — | — | — | — | 0.5 |
| Properties | | | | | | | | |
| Gunnability at 300° F. | exc. | v.gd. | exc. | exc. | exc. | exc. | exc. | good |

| | Formulation (Quantity pbw) | | | | | | | |
|---|---|---|---|---|---|---|---|---|
| | 1 | 2 | 3 | 4 | 5 | 6 | 7 | 8 |
| Hardness (Shore A) | | | | | | | | |
| Before Gunning | 32 | 31 | 32 | 27 | 34 | 17 | 12 | 33 |
| After Gunning | 30 | 30 | 32 | 25 | 32 | 20 | 22 | 30 |

The subject matter which applicant regards as his invention is particularly pointed out and distinctly claimed as follows:

1. A curable composition comprising a thiol terminated liquid polysulfide polymer, a curing amount of zinc oxide, and a sulfur containing compound selected from 2-mercaptobenzothiazole, zinc diloweralkyldithiocarbamate, and alkyl thiuram polysulfides of the formula:

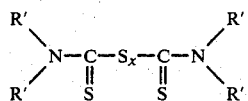

wherein x is from about 2 to about 6 and R' is alkyl of from 1 to about 10 carbon atoms either straight chain, branched chain or cyclic, or the R' moieties attached to the same nitrogen atom may be concatenated and taken together with said nitrogen atom form a heterocyclic ring, and at least one extrudability improver selected from copolymers of styrene with alkylenes, phenolic resins, coumarone-indene resins, polyalkylene polymers, factice, terpene resins, terpene resin esters, benzothiazyl disulfide and diphenyl guanidine.

2. A curable composition as defined in claim 1 comprising from about 2 to about 25 parts by weight zinc oxide per hundred parts by weight liquid polysulfide polymer, and from about 0.1 to about 50 parts by weight of sulfur containing compound per hundred parts by weight liquid polysulfide polymer.

3. A curable composition as defined in claim 2 comprising from about 3 to about 10 parts by weight zinc oxide per hundred parts liquid polysulfide polymer, and from 0.5 to about 10 parts by weight sulfur containing compound per hundred parts by weight liquid polysulfide polymer.

4. A curable composition as defined in claim 1 wherein the extrudability improver is a styrene-isoprene-styrene block copolymer.

5. A curable composition as defined in claim 1 wherein the extrudability improver is a mixture comprising benzothiazyl disulfide and diphenyl guanidine.

6. A curable composition as defined in claim 1 wherein the sulfur containing compound is 2-mercaptobenzothiazole.

7. A curable composition as defined in claim 1 wherein the sulfur containing compound is a zinc diloweralkyldithiocarbamate.

8. A curable composition as defined in claim 7 wherein the zinc diloweralkyldithiocarbamate is zinc dimethyldithiocarbamate.

9. A curable composition as defined in claim 1 wherein the sulfur containing compound has the formula:

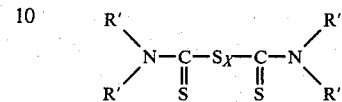

wherein x is from about 2 to about 6 and R' is alkyl of from 1 to about 10 carbon atoms either straight chain, branched chain or cyclic, or the R' moieties attached to the same nitrogen atom may be concatenated and taken together with said nitrogen atom form a heterocyclic ring.

10. A curable composition as defined in claim 9 wherein R' is methyl and x is 2.

11. A curable composition as defined in claim 9 wherein R' is ethyl and x is 2.

12. A curable composition as defined in claim 9 where the R' pairs bonded to a common nitrogen atom are concatenated to form pentamethylene moieties and x is 6.

13. A cured rubber composition which is capable of being extruded after heating at a temperature of about 220° F. to about 390° F. with substantial recovery of its pre-extrusion physical properties upon cooling, said cured rubber composition comprising a thiol terminated liquid polysulfide polymer cured with zinc oxide and a sulfur containing compound selected from 2-mercaptobenzothiazole, zinc diloweralkyldithiocarbamate, and alkyl thiuram polysulfides of the formula:

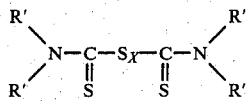

wherein x is from about 2 to about 6 and R' is alkyl of from 1 to about 10 carbon atoms either straight chain, branched chain or cyclic, or the R' moieties attached to the same nitrogen atom may be concatenated and taken together with said nitrogen atom form a heterocyclic ring, and at least one extrudability improver selected from copolymers of styrene with alkylenes, phenolic resins, coumarone-indene resins, polyalkylene polymers, factice, terpene resins, terpene resin esters, benzothiazyl disulfide and diphenyl guanidine.

14. A cured rubber composition as defined in claim 13 wherein the extrudability improver is a styrene-isoprenestyrene block copolymer.

15. A cured rubber composition as defined in claim 13 wherein the extrudability improver is a mixture of benzothiazyl disulfide and diphenyl guanidine.

16. A cured rubber composition as defined in claim 13 wherein the sulfur containing compound is 2-mercaptothiazole.

17. A cured composition as defined in claim 13 wherein the sulfur containing compound is a zinc diloweralkyldithiocarbamate.

18. A cured rubber composition as defined in claim 17 wherein the diloweralkyldithiocarbamate is dimethyldithiocarbamate.

19. A cured rubber composition as defined in claim 13 wherein the sulfur containing compound has the formula:

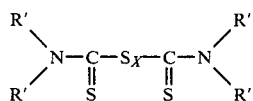

wherein x is from about 2 to about 6 and R' is alkyl of from 1 to about 10 carbon atoms either straight chain, branched chain or cyclic, or the R' moieties attached to the same nitrogen atom may be concatenated and taken together with said nitrogen atom form a heterocyclic ring.

20. A cured rubber composition as defined in claim 19 wherein R' is methyl and x is 2.

21. A cured rubber composition as defined in claim 19 wherein R' is ethyl and x is 2.

22. A cured rubber composition as defined in claim 19 wherein the R' pairs bonded to a common nitrogen atom are concatenated to form a pentamethylene moiety and x is 6.

* * * * *

UNITED STATES PATENT AND TRADEMARK OFFICE
CERTIFICATE OF CORRECTION

PATENT NO. : 4,314,920
DATED : February 9, 1982
INVENTOR(S) : Edward G. Millen, Frank K. Pypcznski It is certified that error appears in the above—identified patent and that said Letters Patent is hereby corrected as shown below:

On the title page, under the words "United States Patent" the name "Millen" should read --Millen et al--;

following "[75]Inventor: Edward G. Millen, Princeton, N.J." add --and Frank K. Pypcznski, Lawrenceville, N.J.--.

Column 3, line 14, "convention" should read --conventional--.

Column 6, in the table for Example 1 at the row identified as "A-187(silane adhesive additive-Union Carbide)" a --2-- should appear in each of columns 1, 2, 3 and 4 of the table.

Signed and Sealed this

Fifteenth Day of June 1982

[SEAL]

Attest:

Attesting Officer

GERALD J. MOSSINGHOFF

Commissioner of Patents and Trademarks